United States Patent
Li et al.

(10) Patent No.: US 12,468,399 B2
(45) Date of Patent: Nov. 11, 2025

(54) KEY STRUCTURE AND LIFTING MECHANISM THEREOF

(71) Applicant: Silitek Electronics (Dongguan) Co., Ltd, Dongguan (CN)

(72) Inventors: Meng Li, Dongguan (CN); Liang-Hua Zhang, Dongguan (CN)

(73) Assignee: SILITEK ELECTRONICS (DONGGUAN) CO., LTD, Dongguan (CN)

( * ) Notice: Subject to any disclaimer, the term of this patent is extended or adjusted under 35 U.S.C. 154(b) by 0 days.

(21) Appl. No.: 18/617,656

(22) Filed: Mar. 27, 2024

(65) Prior Publication Data

US 2025/0147597 A1    May 8, 2025

(30) Foreign Application Priority Data

Nov. 7, 2023    (CN) .......................... 202311475783.4

(51) Int. Cl.
*G06F 3/02*    (2006.01)

(52) U.S. Cl.
CPC .................................. *G06F 3/0202* (2013.01)

(58) Field of Classification Search
CPC ..................................................... G06F 3/0202
See application file for complete search history.

(56) References Cited

U.S. PATENT DOCUMENTS

| 2017/0191612 A1* | 7/2017 | Yen ........................ H01H 3/125 |
| 2018/0302090 A1* | 10/2018 | Hung ..................... H03K 17/98 |
| 2019/0237278 A1* | 8/2019 | Yen ........................ H01H 13/83 |
| 2020/0373106 A1* | 11/2020 | Chao .................... H01H 13/803 |

* cited by examiner

*Primary Examiner* — Amit Chatly
(74) *Attorney, Agent, or Firm* — WPAT, PC

(57) ABSTRACT

The invention discloses a lifting mechanism. The lifting mechanism includes a first pivot element and a second pivot element. The first pivot element has a pivot hole and includes a first pivot portion. The pivot shaft is pivoted to the pivot hole, and the first pivot portion and the second pivot portion are configured to be pivoted to the same slide groove.

19 Claims, 16 Drawing Sheets

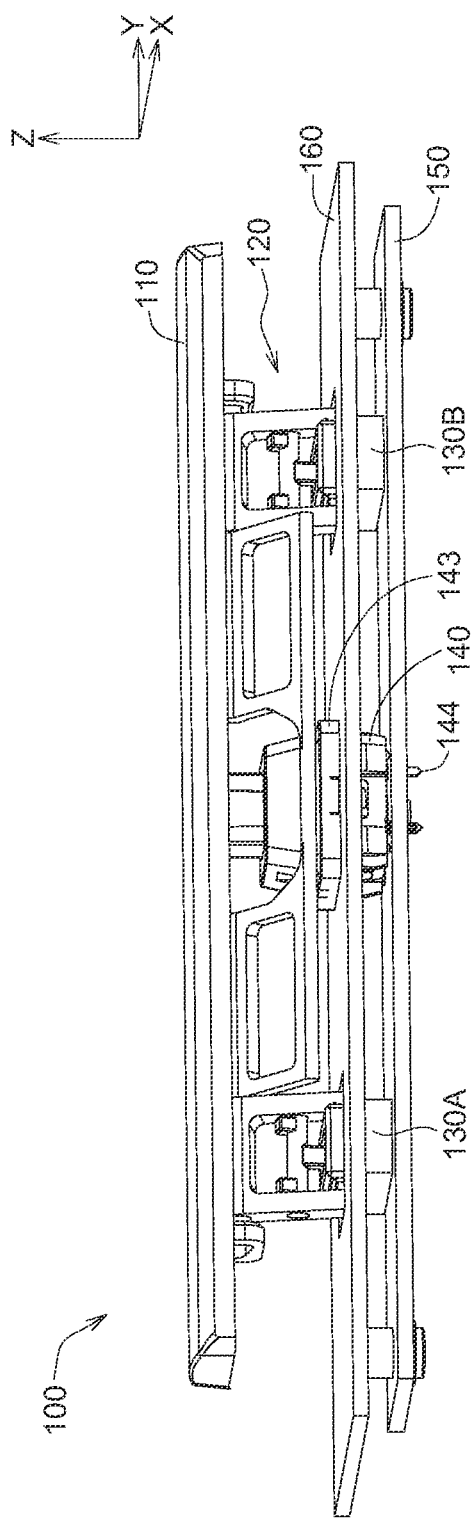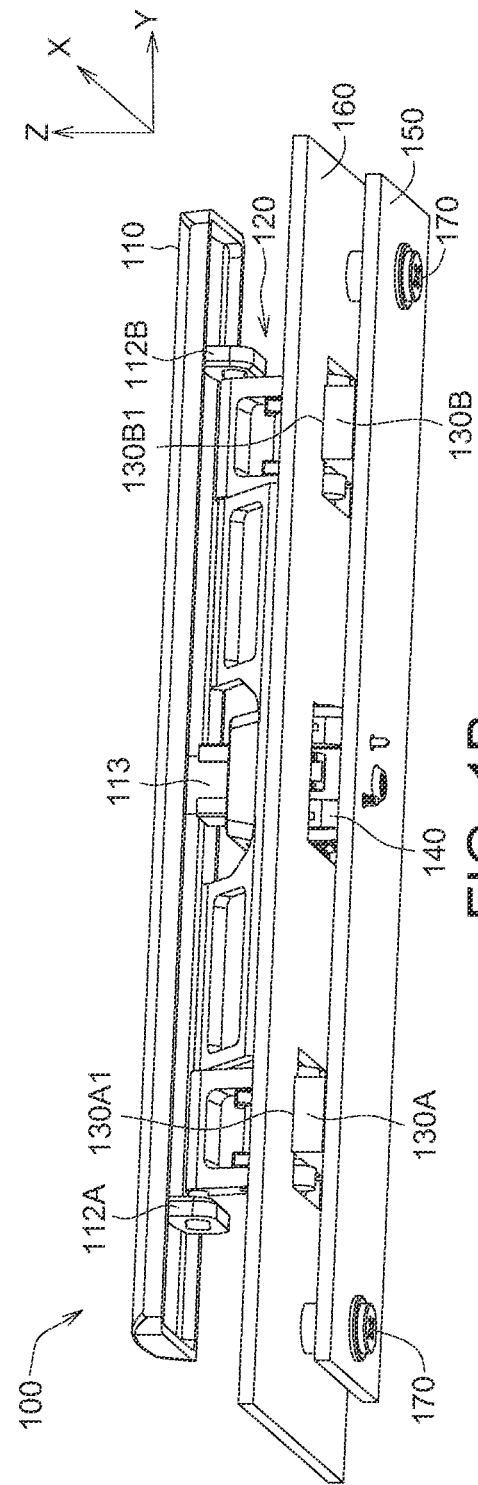

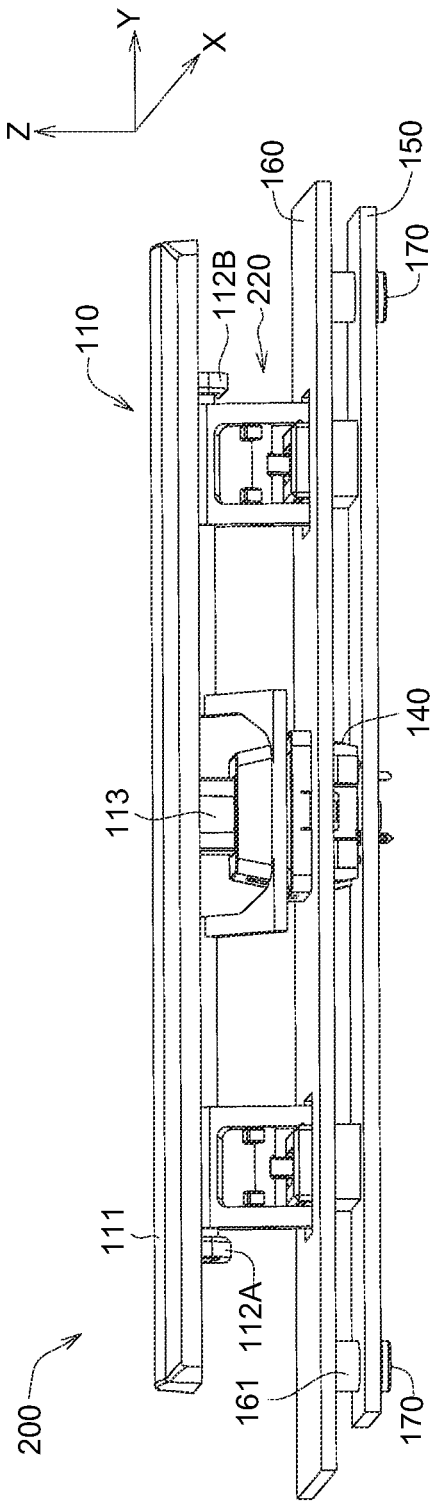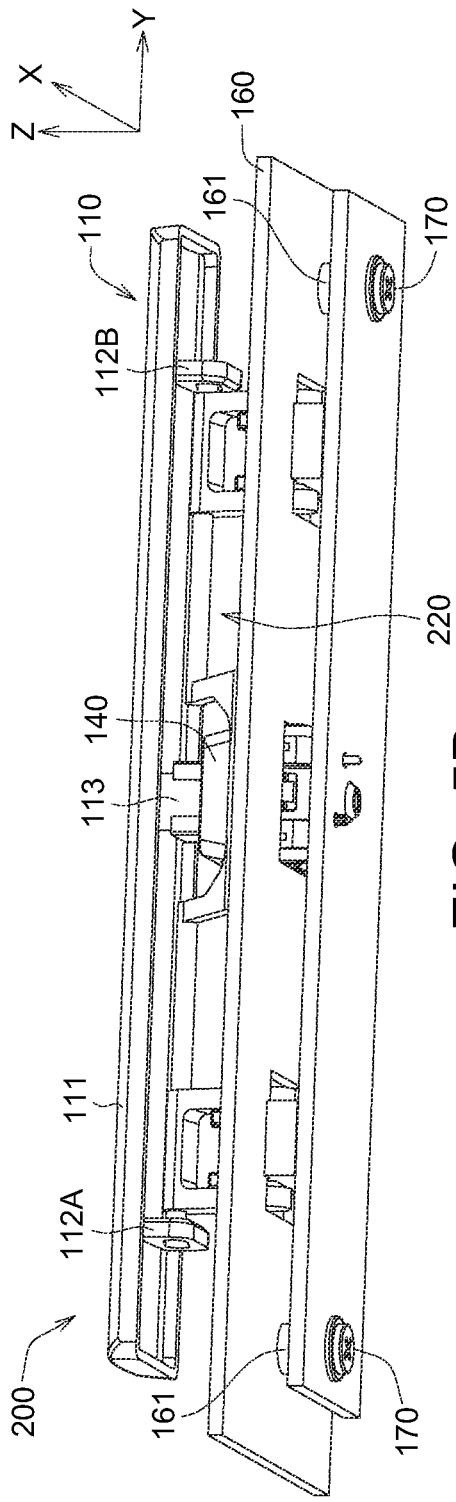
FIG. 5A
FIG. 5B

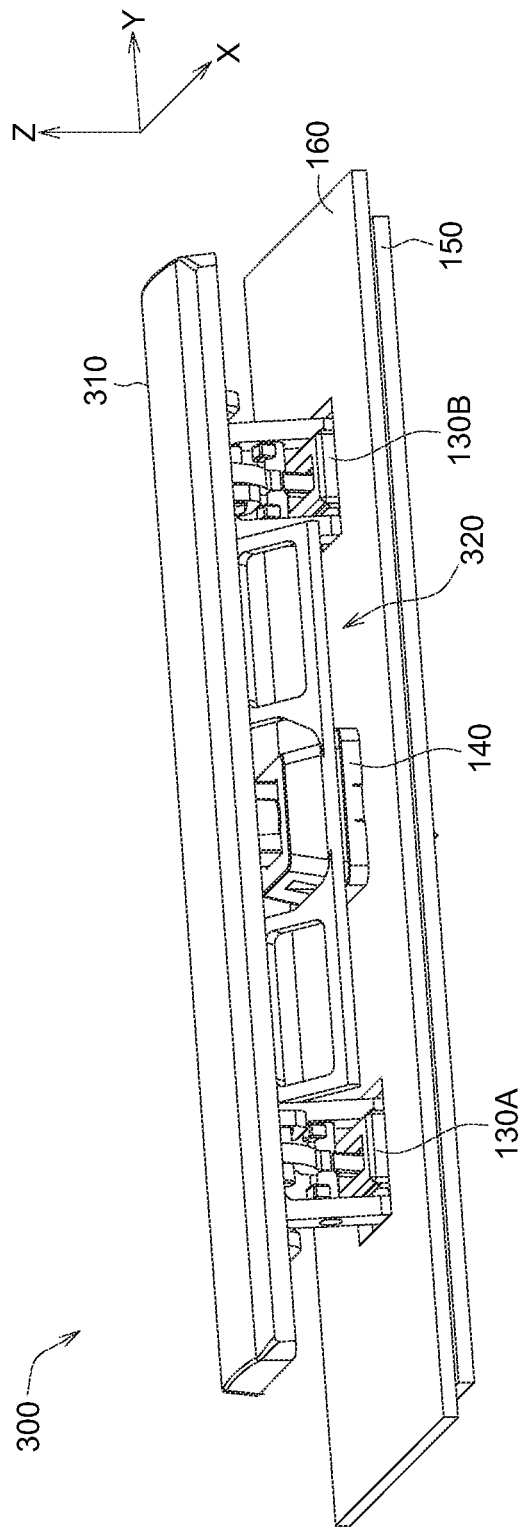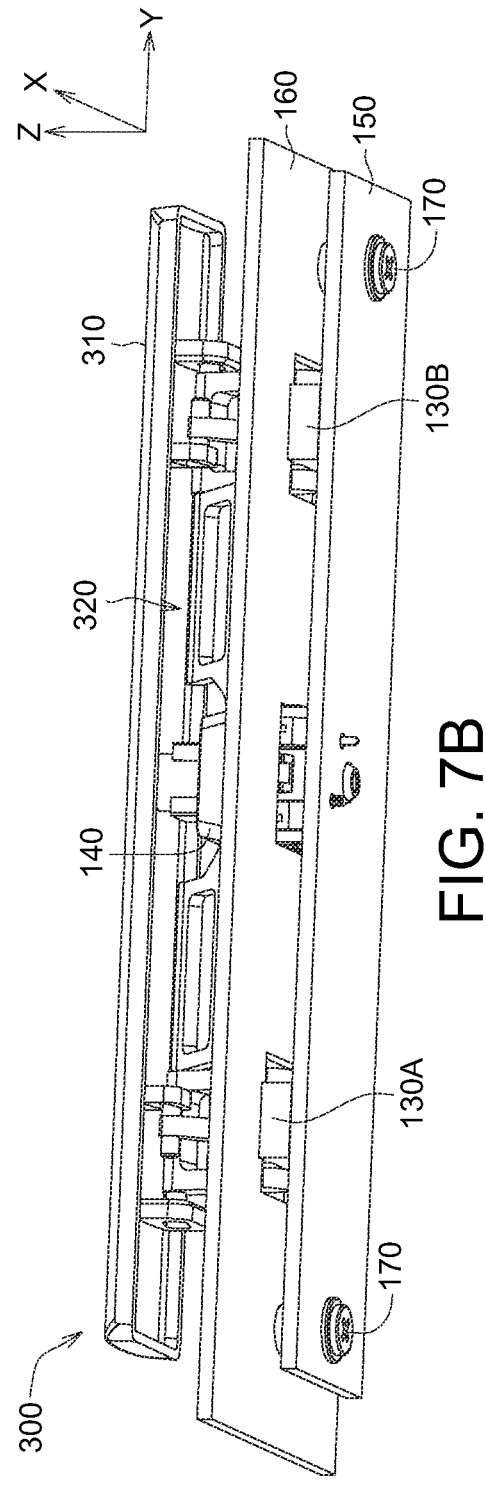

KEY STRUCTURE AND LIFTING MECHANISM THEREOF

This application claims the benefit of People's Republic of China application Serial No. 202311475783.4, filed on Nov. 7, 2023, the subject matter of which is incorporated herein by reference.

BACKGROUND OF THE INVENTION

Field of the Invention

The invention relates in general to a key structure and a lifting mechanism thereof.

Description of the Related Art

The conventional key structure includes a key cap for the user to press. In order to provide a lifting function, the key structure generally includes a lifting mechanism which pivotally connects a base plate with the keycap so that the keycap may be raised and lowered relative to the base plate. However, in terms of assembly, the base plate, the keycap and the lifting mechanism need to be individually configured with a large number of pivot portions, resulting in a relatively complicated structural design.

SUMMARY OF THE INVENTION

The present invention relates to a key structure and a lifting mechanism thereof.

According to an embodiment of the present invention, a lifting mechanism is provided. The lifting mechanism includes a first pivot element and a second pivot element. The first pivot element has a pivot hole and includes a first pivot portion. The pivot shaft is pivoted to the pivot hole, and the first pivot portion and the second pivot portion are configured to be pivoted to the same slide groove.

According to another embodiment of the present invention, a key structure is provided. The key structure includes a keycap, a carrying element, a base, a restore element and a lifting mechanism. The base is disposed on the carrying element. The restore element is disposed between the keycap and the carrying element. The lifting mechanism pivotally connects the base with the keycap.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIGS. 1A to 1B illustrate schematic diagrams of the perspective views of the key structure 100 viewed from different viewing angles according to an embodiment of the present invention;

FIG. 2A illustrates a schematic diagram of an exploded view of the key structure 100 in FIG. 1A;

FIG. 2B illustrates a schematic diagram of an exploded view of the key structure 100 in FIG. 1B;

FIG. 3A illustrates a schematic diagram of an exploded view of the lifting mechanism 120, a base 130A and a base 130B in FIG. 1A;

FIG. 3B illustrates a schematic diagram of an exploded view of the lifting mechanism 120, the base 130A and the base 130B in FIG. 1B;

FIG. 4A illustrates a schematic diagram of a side view of the key structure 100 in FIG. 1A;

FIG. 4B illustrates a schematic diagram of a side view of the key structure 100 in FIG. 1B;

FIGS. 5A and 5B illustrate schematic diagrams of the perspective views of a key structure 200 viewed from different viewing angles according to an embodiment of the present invention;

FIG. 6A illustrates a schematic diagram of an exploded view of the key structure 200 in FIG. 5A;

FIG. 6B illustrates a schematic diagram of an exploded view of the key structure 200 in FIG. 5B;

FIGS. 7A to 7B illustrate schematic diagrams of the perspective views of a key structure 300 viewed from different viewing angles according to an embodiment of the present invention;

FIG. 8A illustrates a schematic diagram of an exploded view of the key structure 300 in FIG. 7A;

FIG. 8B illustrates a schematic diagram of an exploded view of the key structure 300 in FIG. 7B;

FIG. 9A illustrates a schematic diagram of an exploded view of a lifting mechanism 320 and the bases 130A and 130B in FIG. 7A;

FIG. 9B illustrates a schematic diagram of an exploded view of the lifting mechanism 320 and the bases 130A and 130B in FIG. 7B;

FIG. 10 illustrates a schematic diagram of a side view of the key structure 300 in FIG. 7A; and FIG. 11 illustrates a schematic diagram of an exploded view of the lifting mechanism 420 and the bases 430A and 430B according to another embodiment of the present invention.

DETAILED DESCRIPTION OF THE INVENTION

Referring to FIGS. 1A to 4B, FIGS. 1A to 1B illustrate schematic diagrams of the perspective views of the key structure 100 viewed from different viewing angles according to an embodiment of the present invention, FIG. 2A illustrates a schematic diagram of an exploded view of the key structure 100 in FIG. 1A, FIG. 2B illustrates a schematic diagram of an exploded view of the key structure 100 in FIG. 1B, FIG. 3A illustrates a schematic diagram of an exploded view of the lifting mechanism 120, a base 130A and a base 130B in FIG. 1A, FIG. 3B illustrates a schematic diagram of an exploded view of the lifting mechanism 120, the base 130A and the base 130B in FIG. 1B, FIG. 4A illustrates a schematic diagram of a side view of the key structure 100 in FIG. 1A, and FIG. 4B illustrates a schematic diagram of a side view of the key structure 100 in FIG. 1B.

As illustrated in FIGS. 1A, 2A and 3A, the key structure 100 includes a keycap 110, the lifting mechanism 120, at least one base (for example, the base 130A and the base 130B), a restore element 140, a carrying element 150, a position-limited element 160 and at least one fixing element 170. The bases 130A and 130B are disposed on the carrying element 150. The restore element 140 is disposed between the keycap 110 and the carrying element 150. The lifting mechanism 120 pivotally connects the bases (the bases 130A and 130B) with the keycap 110. In the present embodiment, the lifting mechanism 120 includes at least one first pivot element (for example, the first pivot element 121A and the first pivot element 121B) and at least one second pivot element (for example, the second pivot element 122A and the second pivot element 122B). In an embodiment, the combination of the first pivot element and the second pivot element is similar to a scissors mechanism, wherein the first pivot element may be called an "outer scissor (or outer bracket)" and the second pivot element may be called an "inner scissor (or inner bracket)". The first pivot element 121A and the first pivot element 121B are similar or the same in structure, and the first pivot element 121A is used as an example below for description. The second pivot element 122A and the second pivot element 122B are similar or the same in structure, and the second pivot element 122A is used as an example below for description.

Figure 2A:
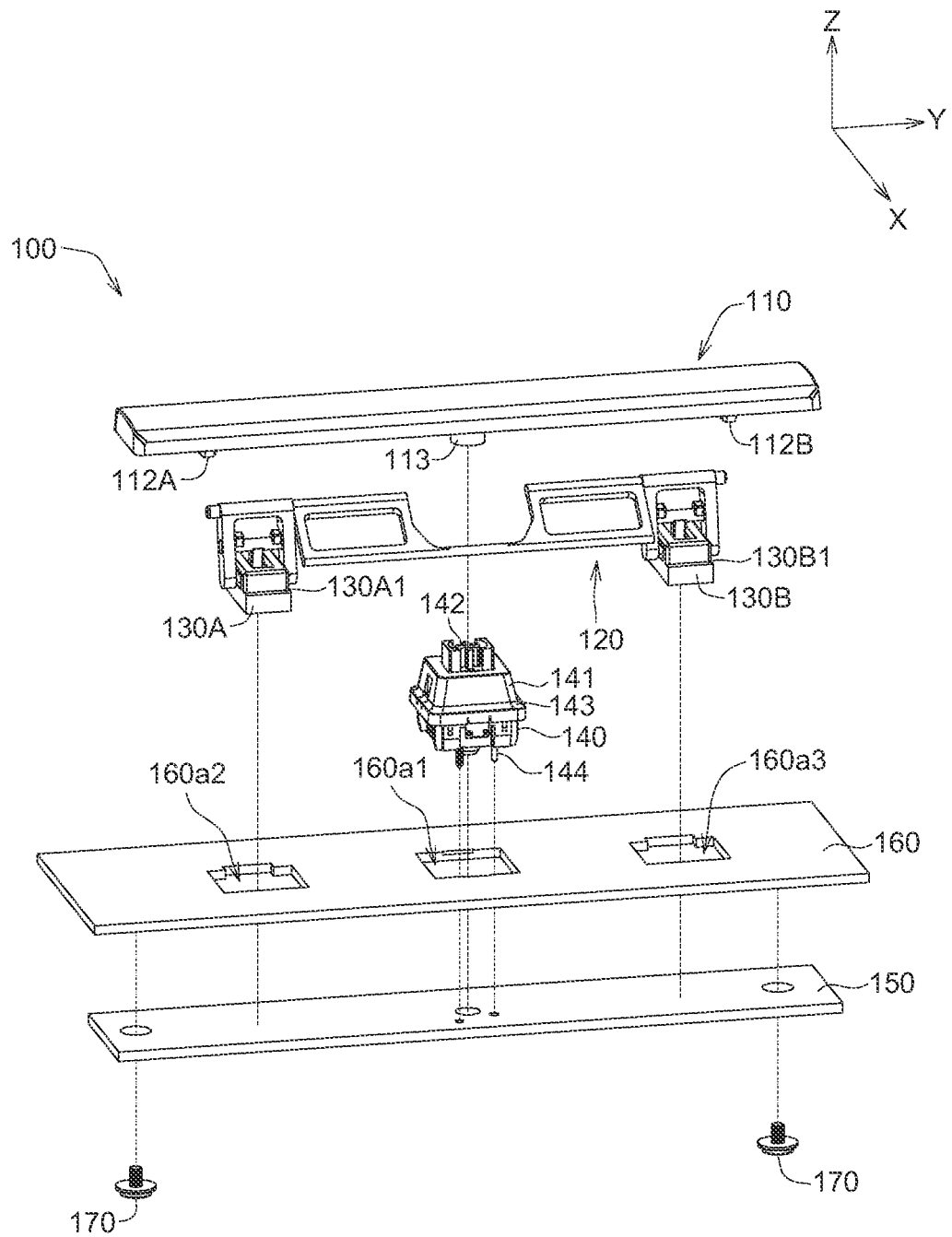
Figure 3A:
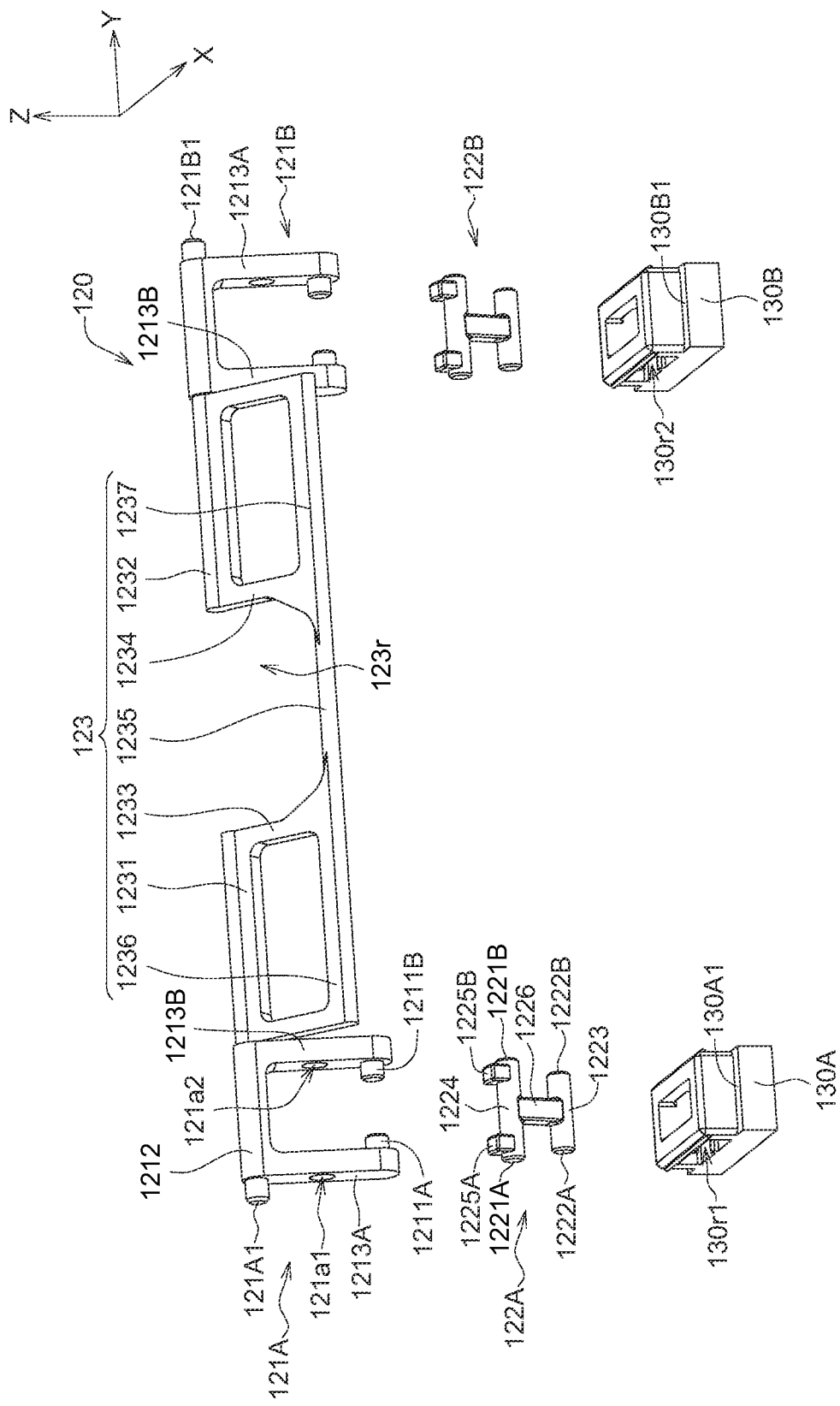

As illustrated in FIGS. 1A, 2A and 3A, the first pivot element 121A has at least one pivot hole (for example, the pivot holes 121a1 and 121a2) and includes at least one first pivot portion (for example, the first pivot portions 1211A and 1211B). The second pivot element 122A includes at least one pivot shaft (for example, the pivot shafts 1221A and 1221B) and at least one second pivot portion (for example, the second pivot portions 1222A and 1222B). The pivot shafts 1221A and 1221B are pivoted to the pivot holes 121a1 and 121a2 respectively, and the first pivot portion 1211A and the second pivot portion 1222A are configured to pivot to the same slide groove, such as the same slide groove 130r1 of the base 130A. As a result, the assembly structure and assembly process for the lifting mechanism and the match element thereof may be simplified.

Figure 2B:
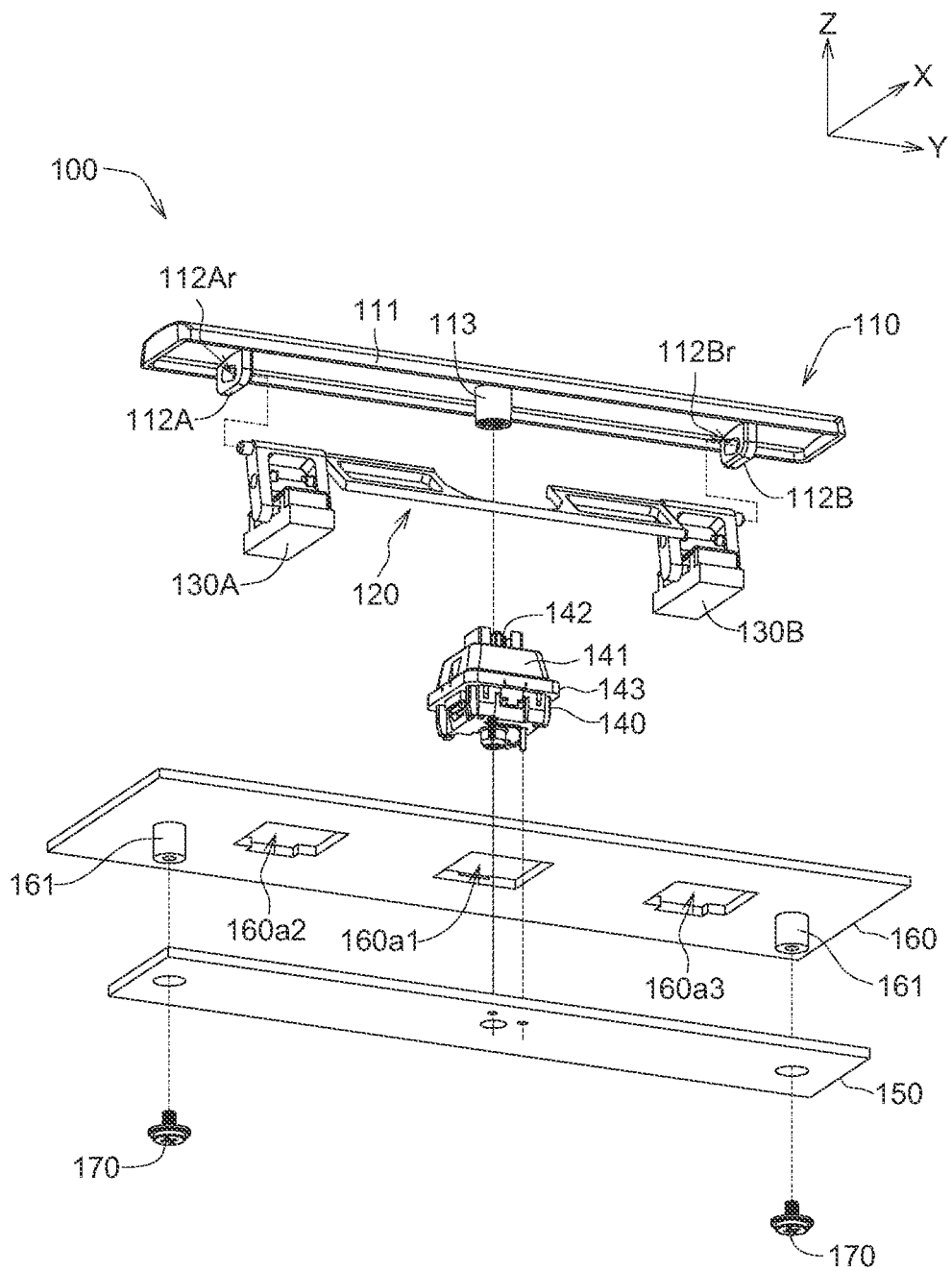

As illustrated in FIG. 2B, the keycap 110 includes a body 111, at least one first keycap pivot portion (for example, the first keycap pivot portions 112A and 112B) and a trigger portion 113. The first keycap pivot portions 112A and 112B are connected to the body 111. The keycap 110 has at least one first slide groove for pivotally connecting the lifting mechanism 120. For example, the first keycap pivot portion 112A has a first slide groove 112Ar, and the first keycap pivot portion 112B has a first slide groove 112Br, wherein the first slide groove 112Ar may be pivoted to the first pivot elements 121A of the lifting mechanism 120, and the first slide groove 112Br may be pivoted to the first pivot element 121B of the lifting mechanism 120. In addition, the trigger portion 113 is connected to the body 111, and the trigger portion 113 corresponds to the restore element 140 in position. In an embodiment, the triggering portion 113 may constantly abut against the restore element 140, which may reduce or even avoid impact noise (for example, when the keycap 110 is pressed).

In an embodiment, the first pivot elements 121A and 121B and the second pivot elements 122A and 122B are formed of the same material (for example, insulating material), such as plastic. As a result, during a relative movement of the first pivot elements 121A and 121B and the second pivot elements 122A and 122B, the generation of noise may be reduced or avoided. Compared with metal, the impact noise generated by plastic is smaller.

As illustrated in FIG. 3A, the first pivot element 121A further includes a first connecting rod 1212, a first pivot rod 1213A and a first pivot rod 1213B disposed opposite to the first pivot rod 1213A. The first connecting rod 1212 connects the first pivot rod 1213A with the first pivot rod 1213B. The first pivot portions 1211A and 1211B of the first pivot element 121A are respectively disposed at an end of the first pivot rod 1213A and an end of the first pivot rod 1213B. In an embodiment, the first connecting rod 1212, the first pivot rod 1213A and the first pivot rod 1213B may form a U-shaped structure.

As illustrated in FIG. 3A, the lifting mechanism 120 further includes a second connecting rod 123 that may connect the first pivot element 121A with the first pivot element 121B. In an embodiment, the second connecting rod 123, the first pivot element 121A and the first pivot element 121B may form an integrally formed pivot element (or referred to as an "outer scissor"). Since the second connecting rod 123 connects the first pivot element 121A with the first pivot element 121B, the number of pivot portions of the keycap 110 may be reduced. In addition, since the second connecting rod 123 connects the first pivot element 121A with the first pivot element 121B, the first pivot element 121A and the first pivot element 121B may move synchronously.

Figure 4A:
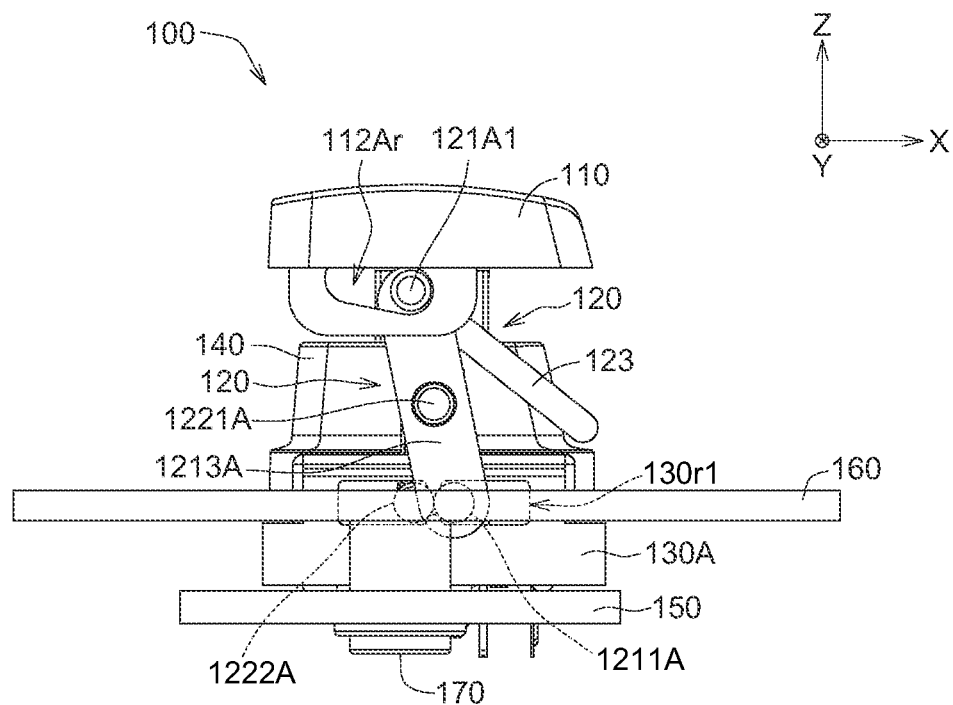
Figure 4B:
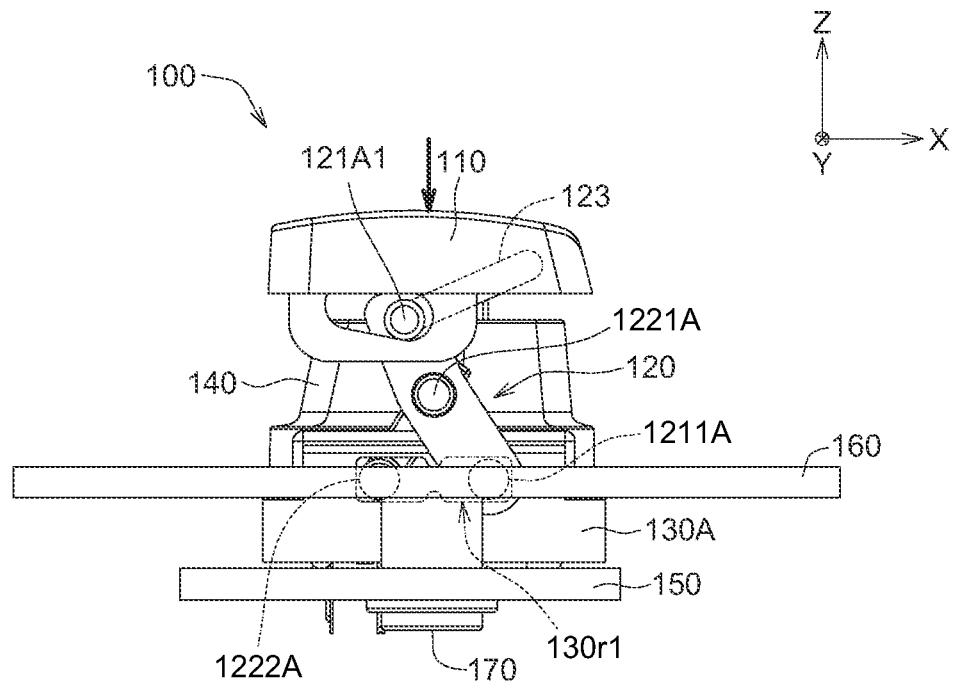

As illustrated in FIG. 3A, the second connecting rod 123 includes an indentation 123r, wherein the indentation 123r may surround the restore element 140. The indentation 123r may avoid the restore element 140 to avoid interference between the second connecting rod 123 and the restore element 140 during the rotation of the lifting mechanism 120 and the base. For example, as illustrated in FIG. 4A, when the keycap 110 is in a released state (unpressed state), the indentation 123r surrounds the restore element 140, and the second connecting rod 123 and the restore element 140 are spaced apart from each other, namely without interfere. As illustrated in FIG. 4B, when the keycap 110 is in the pressed state, the second connecting rod 123 is located above the restore element 140 but is still spaced apart from the restore element 140, namely without interfere. Since the second connecting rod 123 and the restore element 140 are constantly or regularly maintained at a distance, they will not collide with each other and make noise during the rotation of the lifting mechanism 120 and the base.

As illustrated in FIG. 3A, the second connecting rod 123 includes a first sub-rod 1231, a second sub-rod 1232, a third sub-rod 1233, a fourth sub-rod 1234, a fifth sub-rod 1235, a sixth sub-rod 1236 and a seventh sub-rod 1237. The first sub-rod 1231 and the second sub-rod 1232 are connected with the first pivot element 121A and the first pivot element 121B respectively, the third sub-rod 1233 connects the first sub-rod 1231 with the fifth sub-rod 1235, and the fourth sub-rod 1234 connects the second sub-rod 1232 with the fifth sub-rod 1235. The third sub-rod 1233, the fourth sub-rod 1234 and the fifth sub-rod 1235 may surround the aforementioned indentation 123r. In an embodiment, the third sub-rod 1233, the fourth sub-rod 1234 and the fifth sub-rod 1235 may form a U-shaped structure.

As illustrated in FIG. 3A, the sixth sub-rod 1236 connects the first sub-rod 1231 with the fifth sub-rod 1235, or connects the first sub-rod 1231 and with third sub-rod 1233 to increase the strength of the second connecting rod 123. The seventh sub-rod 1237 connects the second sub-rod 1232 with the fifth sub-rod 1235, or connects the second sub-rod 1232 with the fourth sub-rod 1234 to increase the strength of the second connecting rod 123.

As illustrated in FIG. 3A, the lifting mechanism 120 further includes a second pivot rod 1223. The second pivot rod 1223 has two opposite ends. The aforementioned second pivot portions 1222A and 1222B are respectively disposed on two ends of the second pivot rods 1223, or the second pivot portions 1222A and 1222B are respectively the two ends of the second pivot rod 1223.

As illustrated in FIG. 3A, the second pivot element 122A further includes a third pivot rod 1224, and the third pivot rod 1224 has two opposite ends. The aforementioned pivot shafts 1221A and 1221B are respectively disposed at the two ends of the third pivot rod 1224, or the pivot shafts 1221A and 1221B are respectively the two ends of the third pivot rod 1224.

As illustrated in FIG. 3A, the second pivot element 122A further includes at least one stop portion (for example, stop portions 1225A and 1225B), which are respectively disposed adjacent to the pivot shafts 1221A and 1221B. The stopper 1225A may be blocked by the pivot rod 1213A, and it may prevent the third pivot rod 1224 from being separated from the pivot rod 1213A through the pivot hole 121a1. Similarly, the stopper 1225B may be blocked by the pivot rod 1213B, and it may prevent the third pivot rod 1224 from being separated from the pivot rod 1213A through the pivot hole 121a2. In addition, the stop portions 1225A and 1225B are located between the pivot rods 1213A and 1213B and are limited by the stops of the pivot rods 1213A and 1213B, and thus it may reduce or eliminate the displacement (for example, in the Y-axis) of the second pivot element 122A between the pivot rods 1213A and 1213B. Furthermore, in an embodiment, the gap between the stopper 1225A and the pivot rod 1213A is almost zero, and the gap between the stopper 1225B and the pivot rod 1213B is almost zero. As a result, it may avoid the second pivot element 122A moves relative to the first pivot element 121A along the Y-axis direction, thereby reducing or even avoiding the occurrence of impact noise.

As illustrated in FIG. 3A, the second pivot element 122A further includes a third connecting rod 1226. The third connecting rod 1226 may connect the second pivot rod 1223 with the third pivot rod 1224. The third connecting rod 1226, the second pivot rod 1223 and the third pivot rod 1224 may form an "I"-shaped structure, but this is not intended to limit the embodiment of the present invention.

Figure 3B:
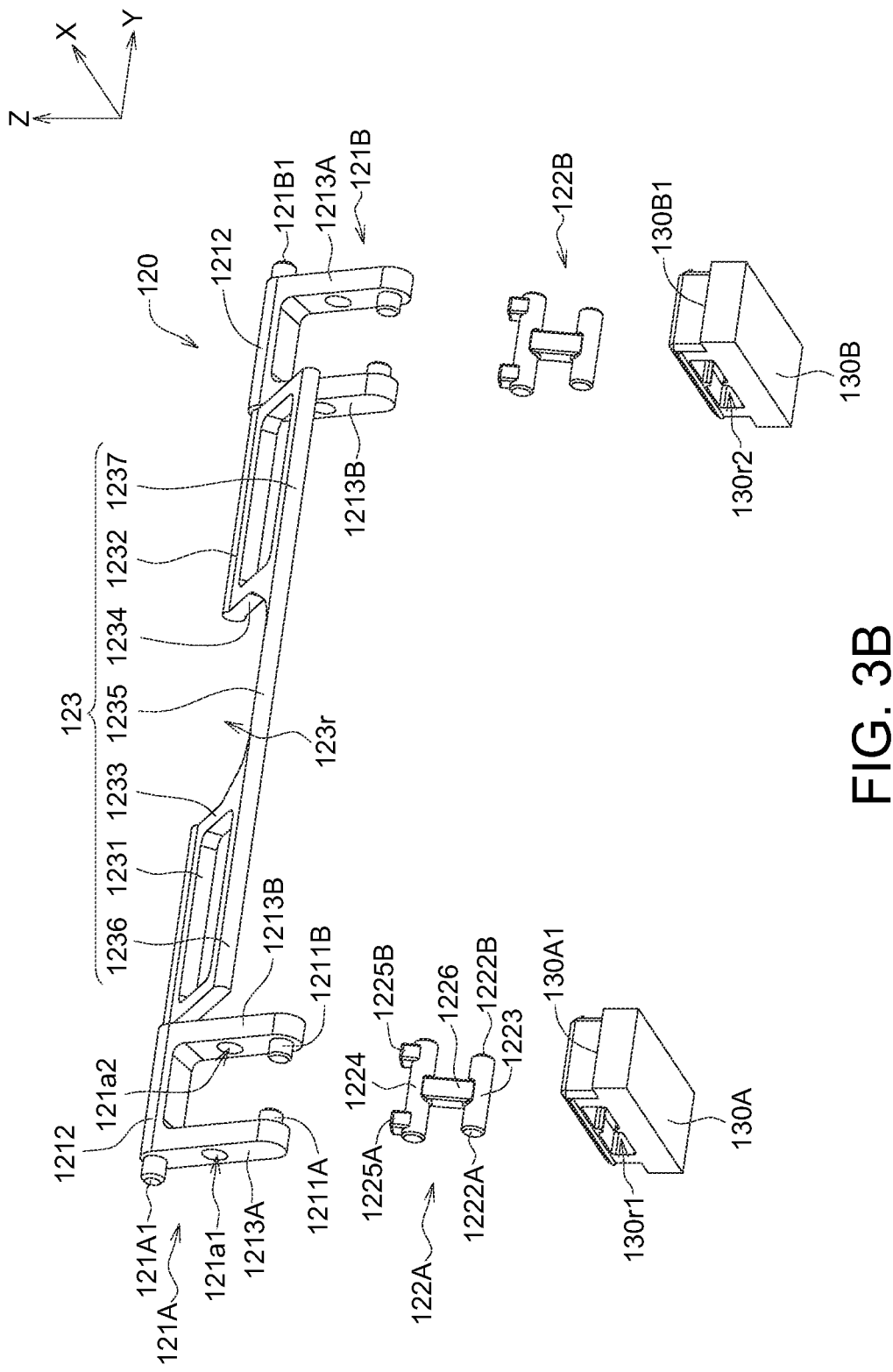

As illustrated in FIGS. 3A and 3B, the first pivot element 121A further includes a third pivot portion 121A1, wherein the third pivot portion 121A1 is disposed on the pivot rod 1213A. The first pivot element 121A is pivoted to the keycap 110 through a third pivot portion 121A1, for example, the first keycap pivot portion 112A of the keycap 110. Similarly, the first pivot element 121B further includes a third pivot portion 121B1, wherein the third pivot portion 121B1 is disposed on the pivot rod 1213A of the first pivot element 121B. The first pivot element 121B is pivoted to the keycap 110 through the third pivot portion 121B1, for example, the first keycap pivot portion 112B of the keycap 110.

As illustrated in FIGS. 2A and 3A, the base 130A has slide grooves 130r1 and 130r2 (the slide groove 130r2 cannot be seen in the base 130A of FIG. 3A, so it is marked on the base 130B), which are respectively pivotally connected to the first pivot portions 1211A and 1211B of the corresponding first pivot element 121A. In the present embodiment, the first pivot portions 1211A and 1211B of the first pivot element 121A are not connected, so the flexibility of the pivot rods 1213A and 1213B may be increased, and the assembly of the first pivot portions 1211A and 1211B assembled to the slide grooves 130r1 and 130r2 may be improved. (the higher the flexibility, the easier the assembly is). The base 130B has the structure the same as or similar to that of the base 130A, and it will not be repeated again.

As illustrated in FIGS. 2A and 3A, the first pivot portion 1211A of the first pivot element 121A and the second pivot portion 1222A of the second pivot element 122A may be pivoted to the same slide groove 130r1 of the base 130A, and the first pivot portion 1211B of the first pivot element 121A and the second pivot portion 1222B of the second pivot element 122A may be pivoted to another slide groove 130r2 of the base 130A. A pivot group (for example, the combination of the first pivot element 121A and the second pivot element 122A) is pivoted to two opposite slide grooves 130r1 and 130r2 of the base 130A with two pivot points respectively, and thus it may increase the movement stability of the pivot group and the base 130A.

As illustrated in FIG. 3A, the restore element 140 is, for example, a switch. The restore element 140 includes a body 141, a trigger portion 142, a pressing portion 143 and at least one pin 144. The trigger portion 142 may be movably, along the Z-axis, disposed on the body 141. Based on an external force acting on the trigger portion 142 along the −Z-axis, the trigger portion 142 may move along the −Z-axis relative to the body 141 until a circuit (not illustrated) in the restore element 140 is turned on. In addition, the trigger portion 142 may be elastically disposed on the body 141 along the Z-axis. As a result, based on the release of the aforementioned external force, the trigger portion 142 may be reset along the +Z-axis relative to the body 141. In addition, the trigger portion 113 of the keycap 110 may be constantly in contact with the trigger portion 142 of the restore element 140 to reduce or even avoid impact noise.

As illustrated in FIG. 1A, the pressing portion 143 of the restore element 140 may abut against the position-limited element 160. In addition, the pins 144 of the restore element 140 may contact or be inserted into the carrying element 150 to be electrically connected to the carrying element 150.

As illustrated in FIG. 3A, the carrying element 150 is, for example, a circuit board, but this is not intended to limit the embodiment of the present invention. The position-limited element 160 has a first through hole 160a1, a second through hole 160a2, and a third through hole 160a3. The restore element 140 may be disposed on the carrying element 150 through the first through hole 160a1, the base 130A may be disposed on the carrying element 150 through the second through hole 160a2, and the base 130B may be disposed on the carrying element 150 through the third through hole 160a3 (the third through hole 160a3 is illustrated in FIG. 2A). In addition, the base 130A may be fixed between the position-limited element 160 and the carrying element 150. For example, the base 130A includes a pressing portion 130A1, and the position-limited element 160 may press the pressing portion 130A1 to press the base 130A against the carrying element 150. Similarly, the base 130B includes a pressing portion 130B1, and the position-limited element 160 may press the resisting portion 130B1 to press the base 130B against the carrying element 150. In addition, the position-limited element 160 further includes at least one fixing post 161. The fixing element 170 may be combined with the fixing post 161 to fix a relative position of the base (130A and 130B), the carrying element 150 and the position-limited element 160. In an embodiment, the fixing element 170 is, for example, a screw, and the fixing post 161 has, for example, a screw hole. The fixing element 170 is screwed with the screw hole of the fixing post 161 to fix the base (130A and 130B), the carrying element 150 and the position-limited element 160.

Figure 6A:
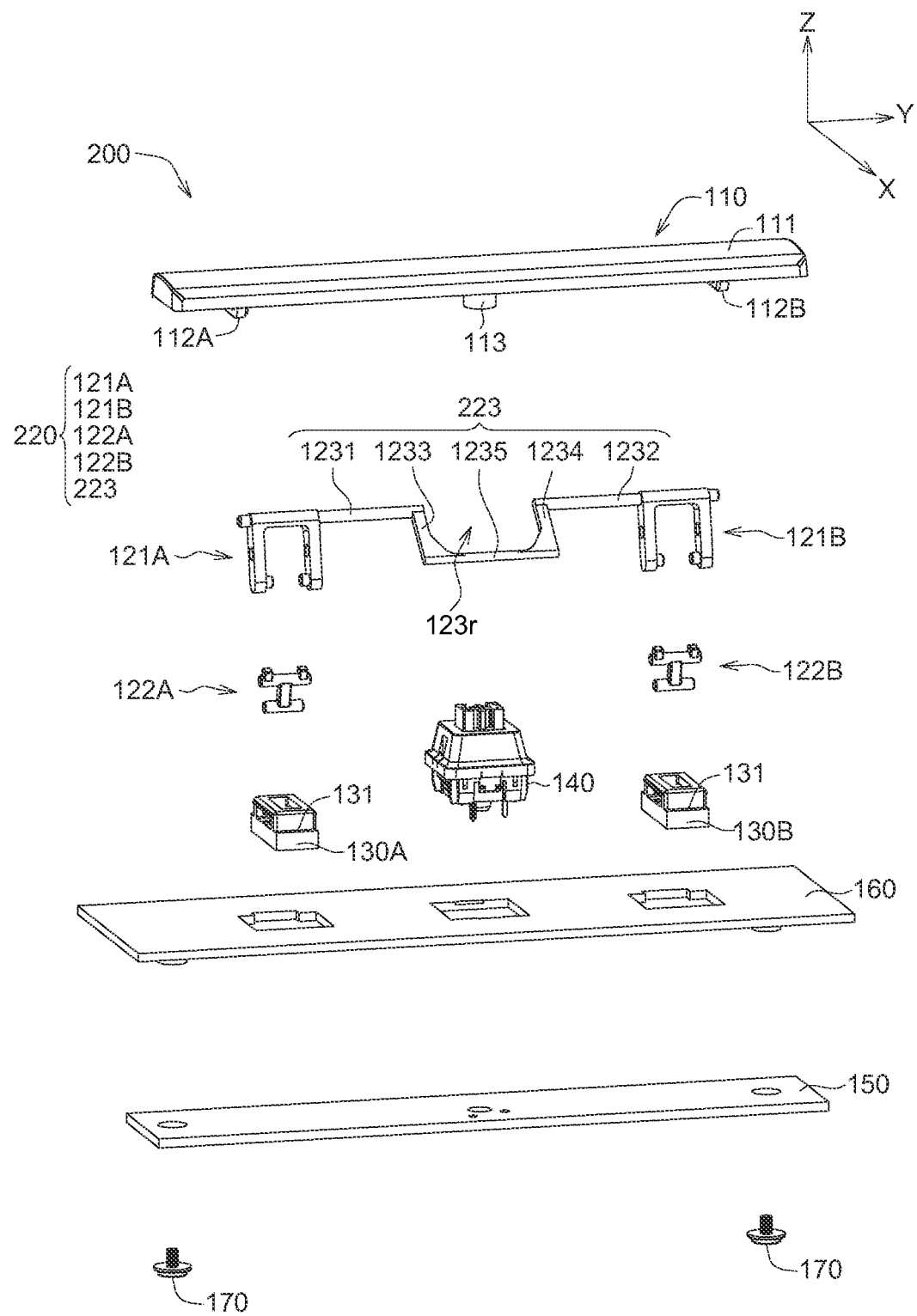
Figure 6B:
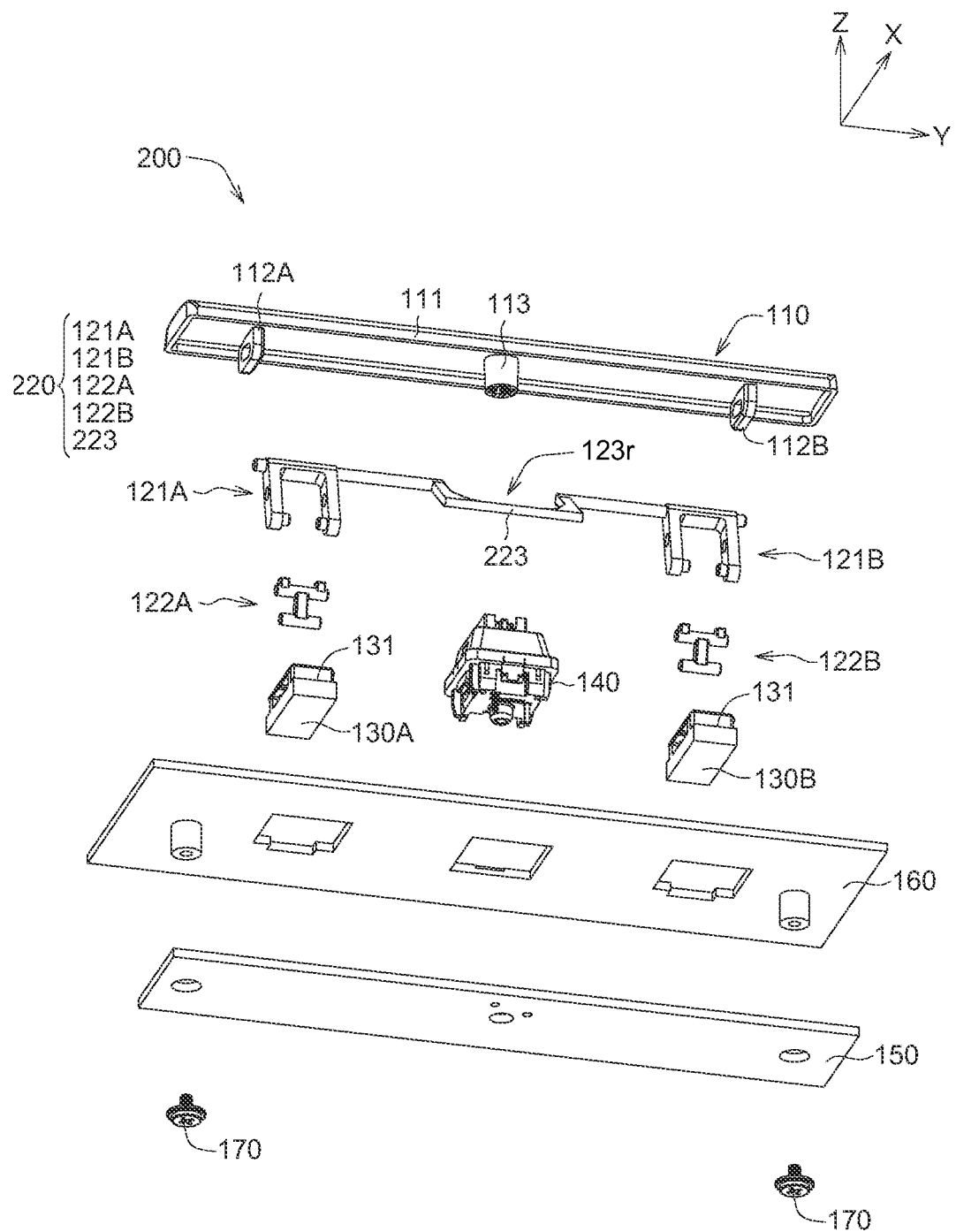

Referring to FIGS. 5A to 6B, FIGS. 5A and 5B illustrate schematic diagrams of the perspective views of a key structure 200 viewed from different viewing angles according to an embodiment of the present invention, FIG. 6A illustrates a schematic diagram of an exploded view of the key structure 200 in FIG. 5A, and FIG. 6B illustrates a schematic diagram of an exploded view of the key structure 200 in FIG. 5B.

As illustrated in FIGS. 5A and 6A, the key structure 200 includes the keycap 110, a lifting mechanism 220, at least one base (for example, the bases 130A and 130B), the restore element 140, the carrying element 150, the position-limited element 160 and at least one fixing element 170. The bases 130A and 130B are disposed on the carrying element 150. The restore element 140 is disposed between the keycap 110 and the carrying element 150. The lifting mechanism 120 is pivotally connected to the base (130A and 130B) with the keycap 110. The key structure 200 of the present embodiment includes the technical features (for example, structure and/or connection relationship) the same as or similar to that of the aforementioned key structure 100, and at least one difference is that the second connecting rod 223 of the key structure 200 is different from the second connecting rod 123 of the key structure 100 in structure.

As illustrated in FIGS. 5A and 6A, the second connecting rod 223 includes a first sub-rod 1231, a second sub-rod 1232, a third sub-rod 1233, a fourth sub-rod 1234 and a fifth sub-rod 1235, wherein the first sub-rod 1231 and the second sub-rod 1232 are connected with the first pivot element 121A and the first pivot element 121B respectively, the third sub-rod 1233 connects the first sub-rod 1231 with the fifth sub-rod 1235, and the fourth sub-rod 1234 connects the second sub-rod 1232 with the fifth sub-pole 1235. The third sub-rod 1233, the fourth sub-rod 1234 and the fifth sub-rod 1235 surround the aforementioned indentation 123r, and the indentation 123r may surround the restore element 140. In an embodiment, the third sub-rod 1233, the fourth sub-rod 1234 and the fifth sub-rod 1235 may form a U-shaped structure. Different from the second connecting rod 123 of the key structure 100, the second connecting rod 223 omits the sixth sub-rod 1236 and the seventh sub-rod 1237.

Figure 8A:
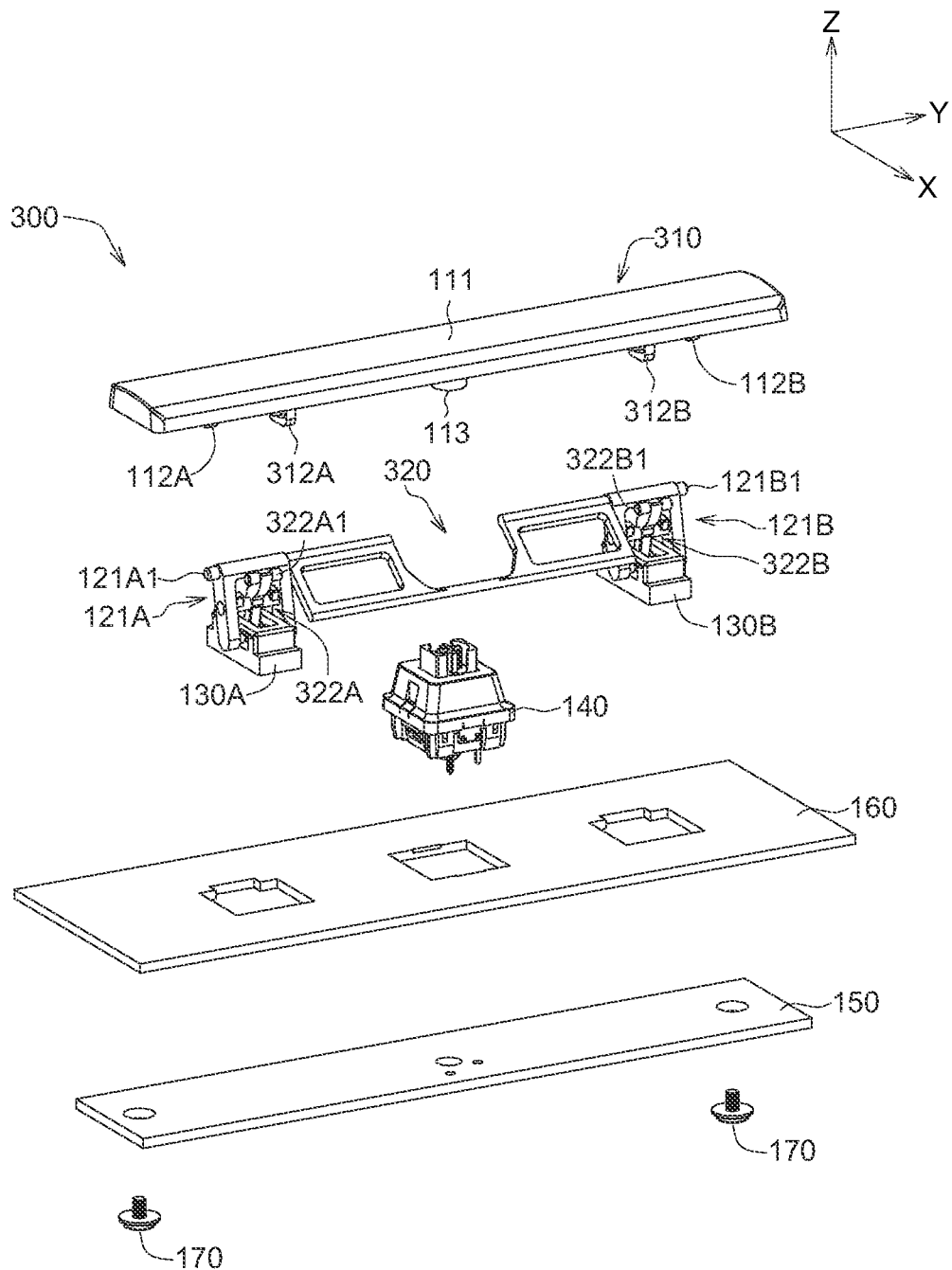
Figure 8B:
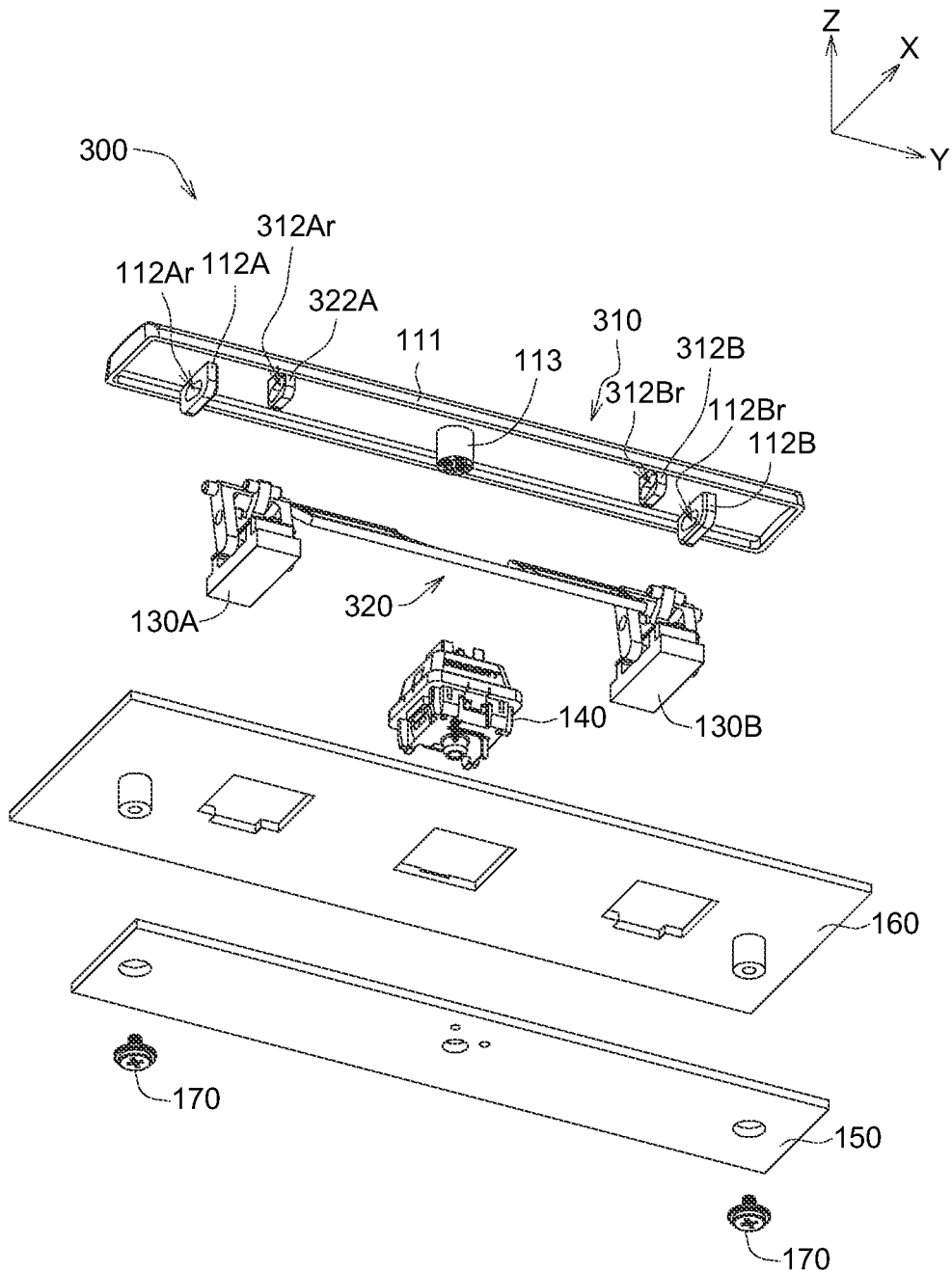
Figure 9A:
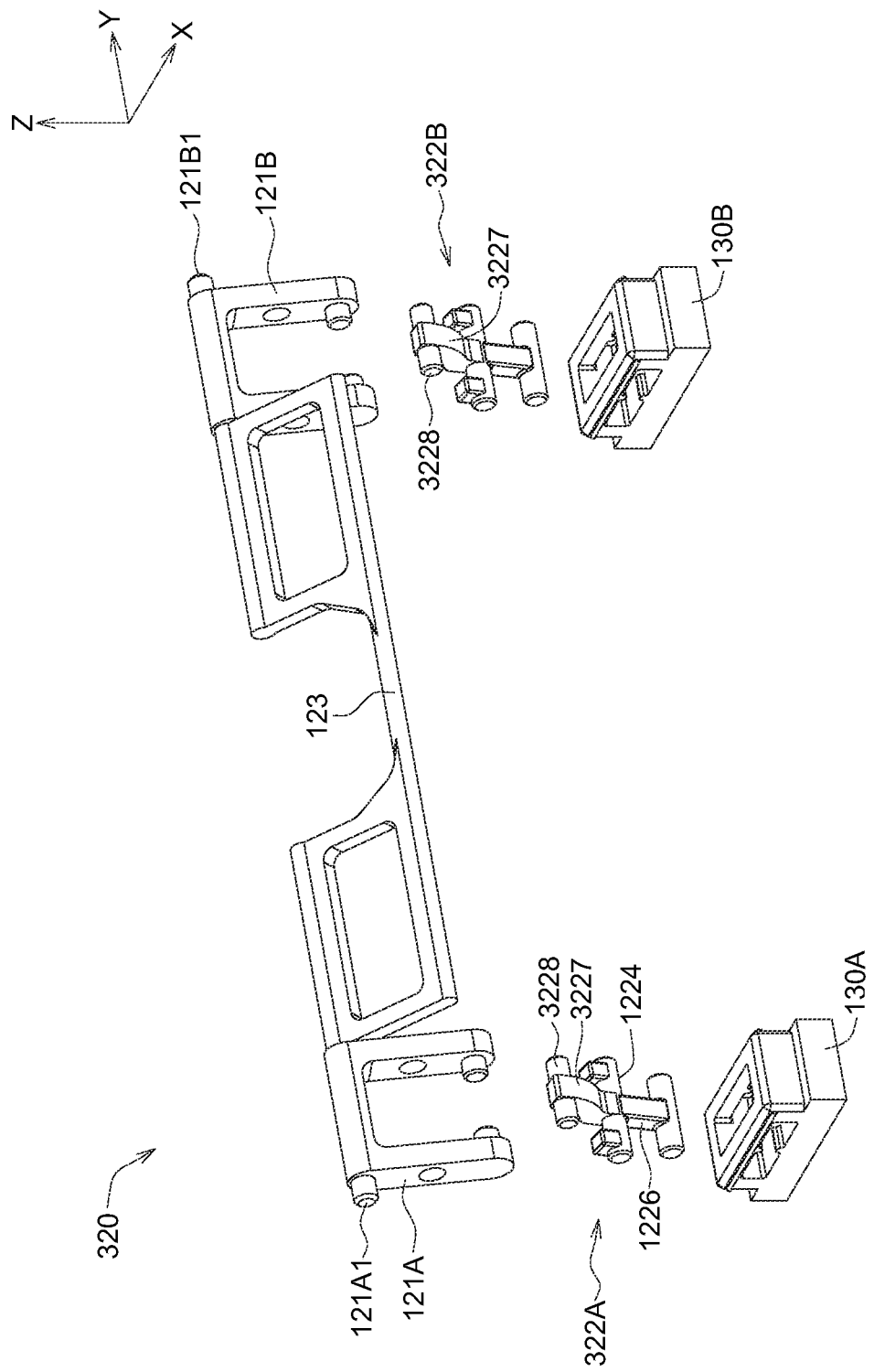
Figure 9B:
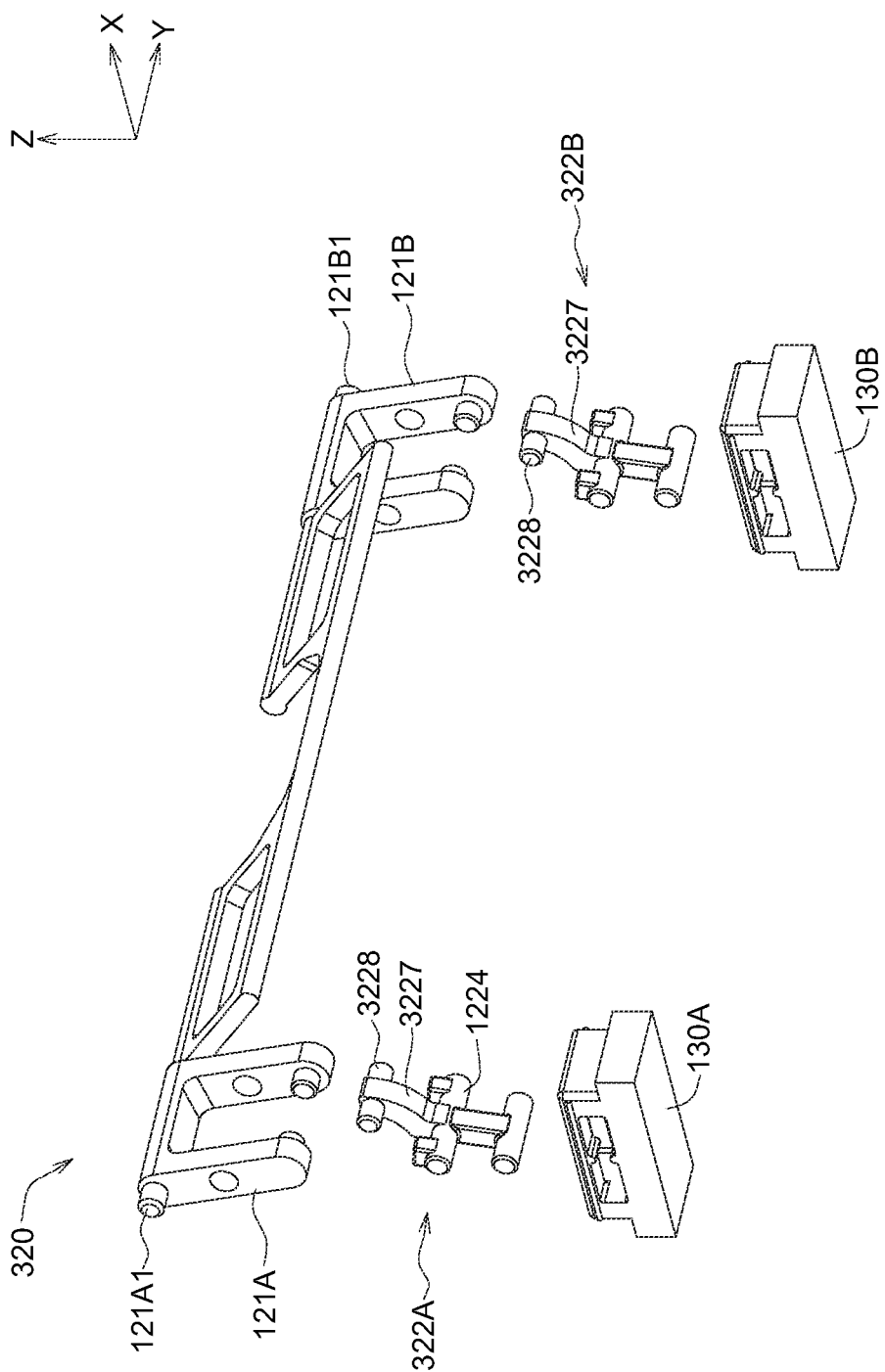
Figure 10:
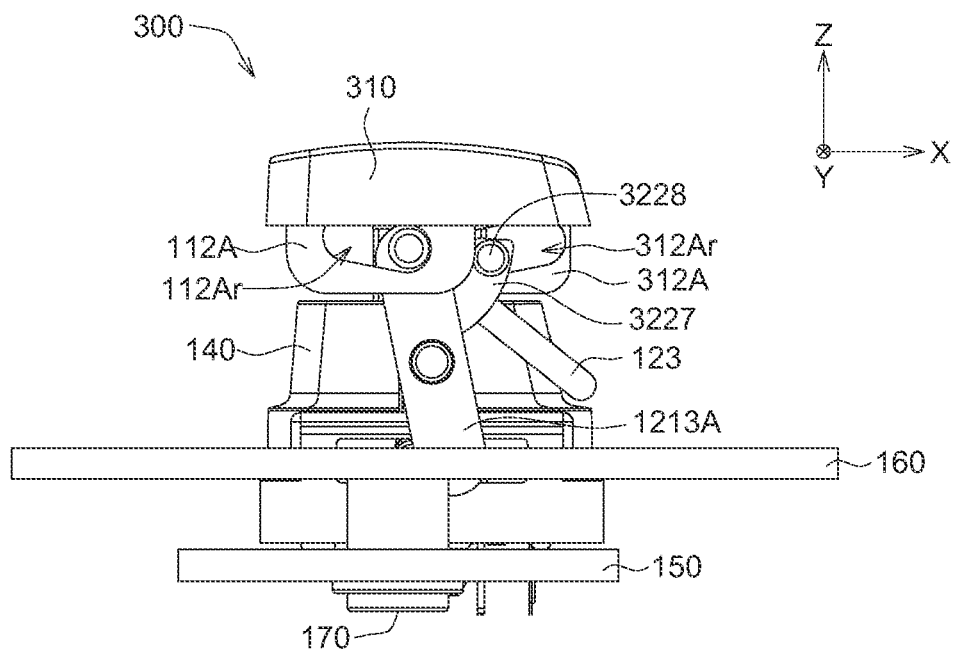

Referring to FIGS. 7A to 10, FIGS. 7A to 7B illustrate schematic diagrams of the perspective views of a key structure 300 viewed from different viewing angles according to an embodiment of the present invention, FIG. 8A illustrates a schematic diagram of an exploded view of the key structure 300 in FIG. 7A, FIG. 8B illustrates a schematic diagram of an exploded view of the key structure 300 in FIG. 7B, FIG. 9A illustrates a schematic diagram of an exploded view of a lifting mechanism 320 and the bases 130A and 130B in FIG. 7A, FIG. 9B illustrates a schematic diagram of an exploded view of the lifting mechanism 320 and the bases 130A and 130B in FIG. 7B, and FIG. 10 illustrates a schematic diagram of a side view of the key structure 300 in FIG. 7A.

As illustrated in FIGS. 7A, 8A and 9A, the key structure 300 includes a keycap 310, a lifting mechanism 320, at least one base (for example, the bases 130A and 130B), the restore element 140, the carrying element 150, the position-limited element 160 and at least one fixing element 170. The bases 130A and 130B are disposed on the carrying element 150. The restore element 140 is disposed between the keycap 310 and the carrying element 150. The lifting mechanism 320 pivotally connect the base (130A and 130B) with the keycap 310. The key structure 300 of the present embodiment includes the technical features (for example, structure and/or connection relationship) the same as or similar to that of the aforementioned key structure 100, and at least one difference is that the keycap 310 of the key structure 300 and the keycap 110 of the key structure 100 are different in structure, and the lifting mechanism 320 of the key structure 300 and the lifting mechanism 120 of the key structure 100 are different in structure.

As illustrated in FIGS. 8A to 9B, the lifting mechanism 320 includes at least one first pivot element (for example, the first pivot element 121A and the first pivot element 121B) and at least one second pivot element (for example, the second pivot element 322AA and 322B). The first pivot element 121A and the first pivot element 121B are similar or the same in structure, and the first pivot element 121A is used as an example below for description, and the second pivot element 322A and the second pivot element 312B are similar or the same in structure, and the first pivot element 121A is used as an example below for description.

As illustrated in FIGS. 9A and 9B, the lifting mechanism 320 includes the structure the same as or similar to that of the aforementioned lifting mechanism 120, and at least one difference is that the second pivot element 322A of the lifting mechanism 320 further includes a fourth pivot rod 3227 and a fourth pivot portion 3228. The fourth pivot rod 3227 is connected to the third pivot rod 1224 substantially along an extending direction of the third connecting rod 1226 (for example, both extend toward the keycap 310). The fourth pivot portion 3228 is disposed at an end of the fourth pivot rod 3227 and is configured to be pivoted to the second slide groove (it will be described later) of the keycap 310. The second pivot element 322B of the lifting mechanism 320 includes the structure the same as or similar to that of the second pivot element 322A, and it will not be repeated here. Similarly, the second pivot element 322B may be pivoted to the second slide groove of the keycap 310 (it will be described later).

As illustrated in FIGS. 8A and 8B, the keycap 310 includes the body 111 and at least one pivot portion (for example, the first keycap pivot portions 112A and 112B and the second keycap pivot portions 312A and 312B), wherein the first keycap pivot portions 112A and 112B and the second keycap pivot portions 312A and 312B are connected to the body 111. The keycap 310 has at least one first slide groove for pivotally connecting the lifting mechanism 320. For example, the first keycap pivot portion 112A has a first slide groove 112Ar, and the first keycap pivot portion 112B has a first slide groove 112Br, wherein the first slide groove 112Ar may be pivoted to the first pivot element 121A of the lifting mechanism 320, and the first slide groove 112Br may be pivoted to the first pivot element 121B of the lifting mechanism 320. In addition, the keycap 310 has at least one second slide groove for pivotally connecting the lifting mechanism 320. For example, the second keycap pivot portion 312A has a second slide groove 312Ar, and the second keycap pivot portion 312B has a second slide groove 312Br, wherein the second slide groove 312Ar may be pivoted to the fourth pivot portion 3228 of the second pivot element 322A of the lifting mechanism 320, and the second slide groove 312Br may be pivoted to the fourth pivot portion 3228 of the second pivot element 322B of the lifting mechanism 320.

Figure 11:
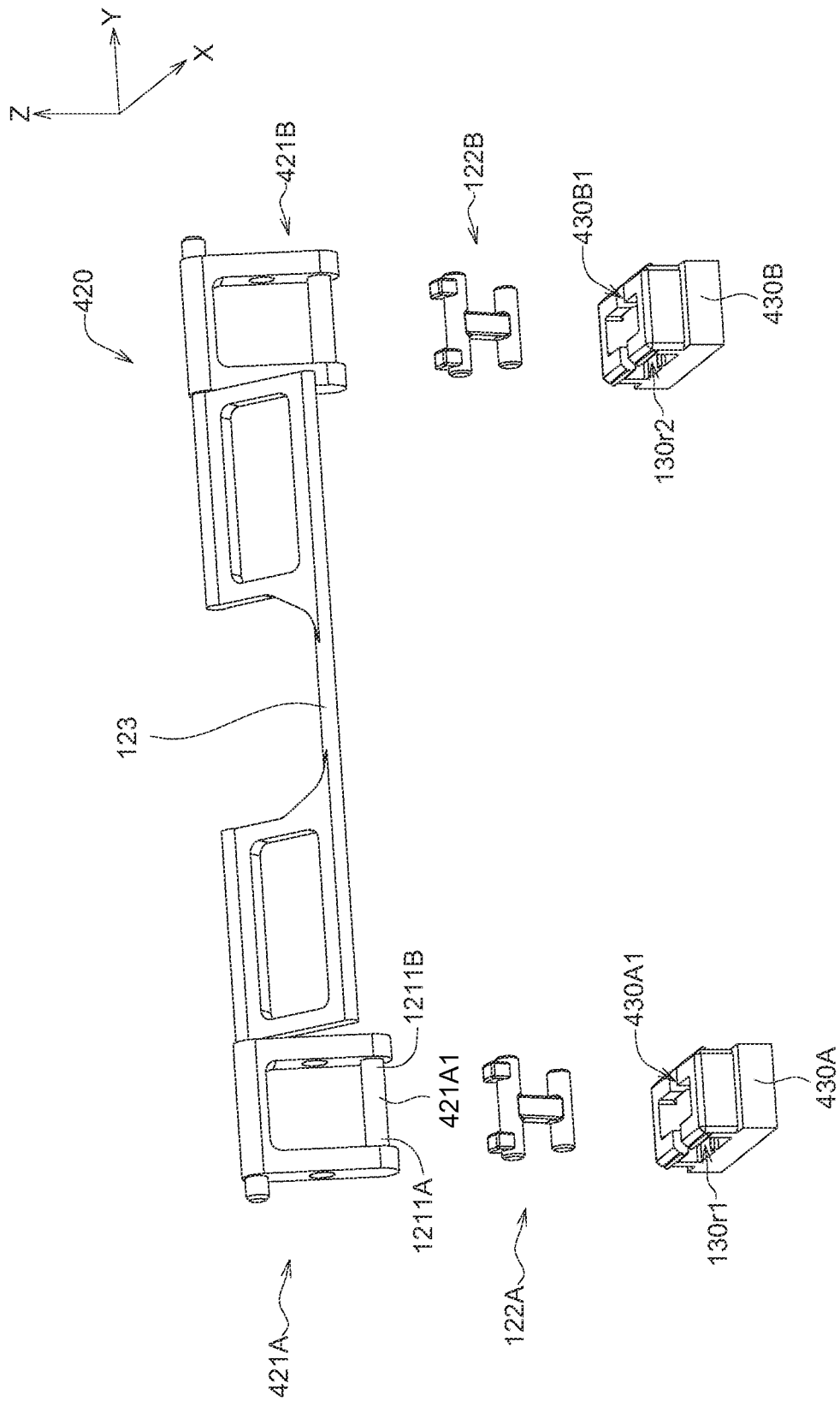

Referring to FIG. 11, FIG. 11 illustrates a schematic diagram of an exploded view of the lifting mechanism 420 and the bases 430A and 430B according to another embodiment of the present invention.

As illustrated in FIG. 11, the lifting mechanism 420 includes at least one first pivot element (for example, a first pivot element 421A and a first pivot element 421B) and at least one second pivot element (for example, the second pivot element 122A and the second pivot element 122B). The first pivot element 421A and the first pivot element 421B are similar or the same in structure, and the first pivot element 421A is used as an example below for description. The second pivot element 122A and the second pivot element 122B are similar or the same in structure, and the second pivot element 122A is used as an example below for description. The base 430A and the base 430B are similar or the same in structure, and the base 430A is used as an example below for description.

As illustrated in FIG. 11, the first pivot element 421A is similar to or the same as the aforementioned first pivot element 121A in structure, and at least one difference is that the first pivot element 421A further includes a connecting rod 421A1, and the connecting rod 421A1 connects the connecting portion 1211A with the first pivoting portion 1211B. In other words, the first pivot portion 1211A and the first pivot portion 1211B are indirectly connected through the connecting rod 421A1. In an embodiment, the first pivot portion 1211A, the first pivot portion 1211B and the connecting rod 421A1 are, for example, an integrally formed structure. The base 430A and the aforementioned base 130A are the same or similar in structure, and at least one difference is that the base 430A has a through hole 430A1 which communicates with the slide grooves 130r1 and 130r2 of the base 430A (the slide groove 130r2 is not visible in the base 430A of FIG. 11, and therefore it is marked on base 430B). The first pivot portion 1211A, the first pivot portion 1211B and/or the connecting rod 421A1 may enter the slide grooves 130r1 and 130r2 through the through hole 430A1 to assemble the second pivot element 122A and the base 430A.

In summary, embodiments of the present invention provide a key structure and a lifting mechanism thereof. The key structure includes a keycap, a base and a lifting mechanism. The lifting mechanism includes a first pivot element and a second pivot element that are pivotally connected to each other. In an embodiment, the first pivot element and the second pivot element may be pivoted to the same slide groove of the base. As a result, the assembly structure and assembly process of the lifting mechanism and the match element thereof may be simplified. In another embodiment, the first pivot element may pivotally connect the keycap with the base, and the second pivot element may only be pivotally connected with the base. In other embodiment, the first pivot element may pivotally connect the keycap with the base, and the second pivot element may also pivotally connect the keycap with the base.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A lifting mechanism, comprising:
   a first pivot element having a pivot hole and comprising a first pivot portion; and
   a second pivot element comprising a pivot shaft and a second pivot portion;
   wherein the pivot shaft is pivoted to the pivot hole, and the first pivot portion and the second pivot portion are configured to be pivoted to the same slide groove;
   wherein the first pivot element further comprises a third pivot portion, and the pivot hole is located between the third pivot portion and the first pivot portion;
   wherein the first pivot element further comprises a first pivot rod having an outer lateral surface and an inner lateral surface, the third pivot portion is disposed on the outer lateral surface, and the first pivot portion is disposed on the inner lateral surface.

2. The lifting mechanism as claimed in claim 1, wherein the first pivot element further comprises a first connecting rod and two the first pivot rods oppositely disposed, and the first connecting rod connects the two first pivot rods, the first pivot element comprises two first pivot portions, and the two first pivot portions are respectively disposed at two ends of the two first pivot rods.

3. The lifting mechanism as claimed in claim 2, wherein the first pivot element further comprises a connecting rod connecting the two first pivot portions.

4. The lifting mechanism as claimed in claim 1, wherein the lifting mechanism includes two first pivot elements and a second connecting rod, and the second connecting rod connects the two first pivot elements.

5. The lifting mechanism as claimed in claim 4, wherein the second connecting rod comprises an indentation.

6. The lifting mechanism as claimed in claim 4, wherein the second connecting rod comprises a first sub-rod, a second sub-rod, a third sub-rod, a fourth sub-rod and a fifth sub-rod, the first sub-rod and the second sub-rod are connected with the two first pivot elements respectively, the third sub-rod connects the first sub-rod with the fifth sub-rod, the fourth sub-rod connects the second sub-rod with the fifth sub-rod, and the third sub-rod, the fourth sub-rod and the fifth sub-rod surround an indentation.

7. The lifting mechanism as claimed in claim 1, wherein the second pivot element comprises two second pivot portions, and the lifting mechanism further comprises:
   a second pivot rod having two opposite ends;
   wherein the second pivot portions are disposed on the two opposite ends of the second pivot rod respectively.

8. The lifting mechanism as claimed in claim 1, wherein the second pivot element comprises two the pivot shafts; the second pivot element further comprises:
   a third pivot rod having two opposite ends;
   wherein the two pivot shafts are disposed on the two opposite ends of the third pivot rod respectively.

9. The lifting mechanism as claimed in claim 8, wherein the second pivot element further comprises:
   two stop portions respectively disposed adjacent to the two pivot shafts.

10. The lifting mechanism as claimed in claim 1, wherein the second pivot element further comprises:
    a second pivot rod, wherein the second pivot portion is disposed at an end of the second pivot rod;
    a third pivot rod, wherein the pivot shaft is disposed at an end of the third pivot rod; and
    a third connecting rod connecting the second pivot rod with the third pivot rod.

11. The lifting mechanism as claimed in claim 10, wherein the third pivot portion is configured to be pivoted to a first slide groove of a keycap; the second pivot element further comprises:
    a fourth pivot rod connected to the third pivot rod along an extension direction of the third connecting rod; and/or
    a fourth pivot portion disposed at an end of the fourth pivot rod and configured to be pivoted to a second slide groove of the keycap.

12. The lifting mechanism of claim 1, wherein the first pivot element and the second pivot element are plastic elements.

13. A key structure, comprising:
    a keycap;
    a carrying element;
    a base disposed on the carrying element;
    a restore element disposed between the keycap and the carrying element; and
    a lifting mechanism, pivotally connecting the base with the keycap and comprising:

a first pivot element having a pivot hole and comprising a first pivot portion; and a second pivot element comprising a pivot shaft and a second pivot portion;

wherein the pivot shaft is pivoted to the pivot hole, and the first pivot portion and the second pivot portion are configured to be pivoted to the same slide groove.

14. The key structure as claimed in claim 13, wherein the restore element is a switch.

15. The key structure as claimed in claim 13, wherein the keycap comprises a trigger portion, and the trigger portion is in contact with the restore element.

16. The key structure as claimed in claim 13, wherein the base has the same slide groove.

17. The key structure as claimed in claim 13, wherein the keycap has a first slide groove, the first pivot element further comprises a third pivot portion, and the third pivot portion is pivoted to the first slide groove.

18. The key structure as claimed in claim 13, wherein the lifting mechanism comprises two first pivot elements and a second connecting rod, the second connecting rod connects the two first pivot elements, and the second connecting rod comprises an indentation surrounding the restore element.

19. The key structure as claimed in claim 13, wherein the lifting mechanism comprises two first pivot elements and a second connecting rod, the second connecting rod connects the two first pivot elements; the second connecting rods comprises a first sub-rod, a second sub-rod, a third sub-rod, a fourth sub-rod and a fifth sub-rod, the first sub-rod and the second sub-rod are connected with the two first pivot elements, the third sub-rod connects the first sub-rod with the fifth sub-rod, and the fourth sub-rod connects the second sub-rod with the fifth sub-rod;

wherein the fifth sub-rod maintains a distance from the restore element.

\* \* \* \* \*